United States Patent

[11] 3,596,195

| [72] | Inventors | Nikolai Mikhailovich Shirshov;<br>Vladimir Gavrilovich Karpova; Vitktor Dmitrievich Leonov; Vyacheslav Viktorovich Chernyavsky, all of Leningrad, U.S.S.R. |
|---|---|---|
| [21] | Appl. No. | 760,416 |
| [22] | Filed | Sept. 18, 1968 |
| [45] | Patented | July 27, 1971 |
| [73] | Assignee | Spetsialnoe Konstruktorskoe Bjuro Poluprovodnikovykh Priborov Leningrad, U.S.S.R. |

[54] REVERSING PROPORTIONAL PROCESS CONTROLLER
2 Claims, 1 Drawing Fig.

| [52] | U.S. Cl. | 330/1 A, 330/146, 323/36 |
|---|---|---|
| [51] | Int. Cl. | H03f 1/00 |
| [50] | Field of Search | 328/3; 330/1 A; 324/83, 100; 323/34, 36, 37; 317/43 |

[56] References Cited
UNITED STATES PATENTS

| 2,956,234 | 10/1960 | Olsen | 330/10 |
| 3,305,734 | 2/1967 | Buttenhoff | 328/3 X |
| 3,414,834 | 12/1968 | Stubbs | 328/3 X |
| 3,330,970 | 7/1967 | Wennerberg et al. | 328/3 X |
| 3,392,323 | 7/1968 | Darling | 330/1 |

*Primary Examiner*—Nathan Kaufman
*Attorney*—Waters, Roditi and Schwartz

ABSTRACT: A reversing proportional process controller is disclosed which is based on the adjustment of the current of a load. The controller comprises a bridge circuit with a controlled variable transmitter placed in one arm thereof, the bridge circuit being connected to a control signal amplifier, in turn connected to an auxiliary amplifier. A phase sensing unit is connected to the auxiliary amplifier and controls the operation of a switching unit which is connected to the control signal amplifier via a final control element which is constituted as a series combination of a magnetic amplifier and a power rectifier. The switching unit controls current flow to the load in order to rebalance the bridge circuit.

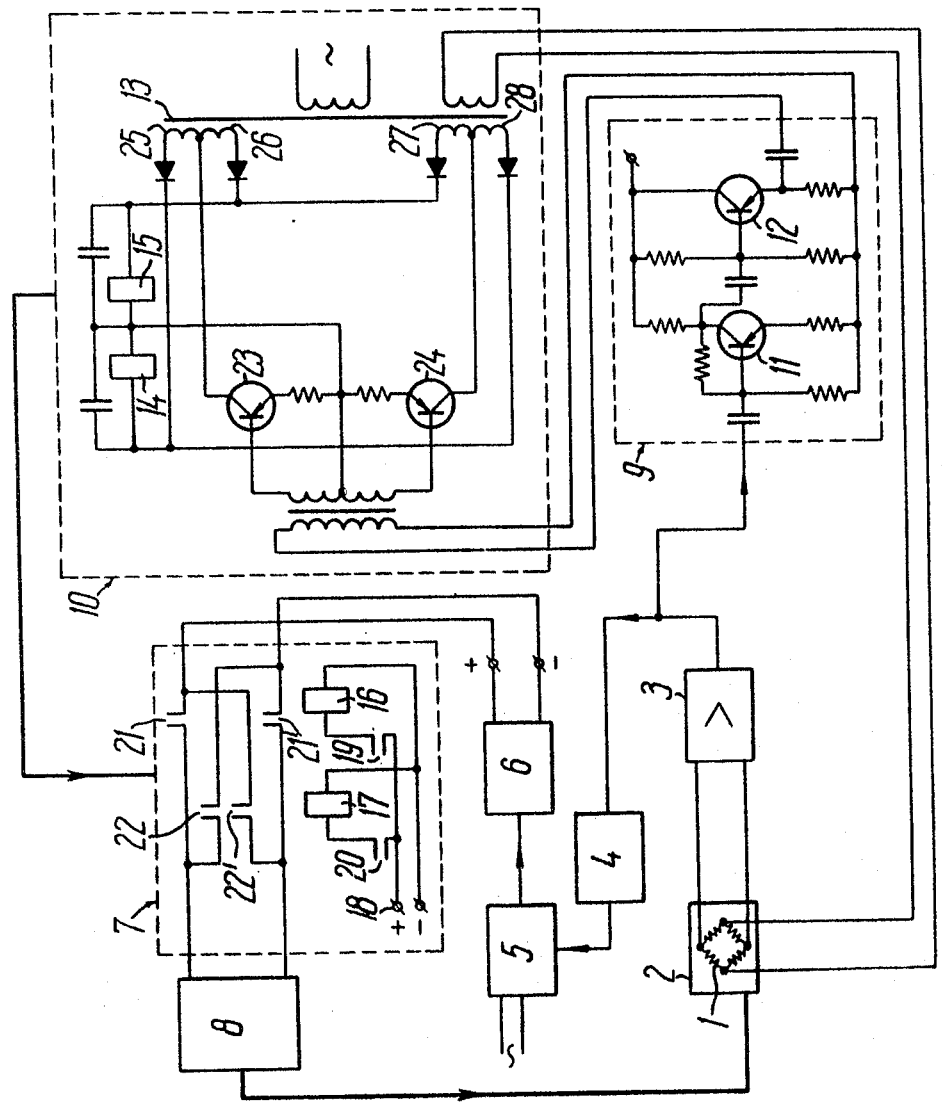

REVERSING PROPORTIONAL PROCESS CONTROLLER

The present invention relates to automatic process controllers, and more specifically to reversing proportional process controllers based on the manipulation of load current.

There exist reversible proportional process controllers based on the manipulation of load current which comprise a controlled-variable transmitter placed in an arm of a bridge circuit connected through a control-signal amplifier to a final control element, and a phase-sensing unit whose response is determined by the phase of the control signal from the output of the bridge circuit. The phase-sensing from the output of the bridge circuit. The phase-sensing unit drives the final control element which manipulates load current so as to optimize the controlled variable.

However, such controllers are of low efficiency since they have to incorporate ballast resistors. Furthermore, such controllers are heavy and large in size, which involves the use of much copper and iron. Last but not least, in such controllers provision has to be made for cooling the ballast resistor.

An object of the present invention is to provide a reversing proportional process controller which has a high efficiency owing to the omission of a ballast resistor.

Another object of the invention is to reduce the weight and size of the controller.

Still another object of the invention is to reduce the amount of copper and iron required.

The invention consists in that a reversing proportional process controller based on the manipulation of load current and comprising a controlled-variable transmitter placed in an arm of a bridge circuit connected through a control-signal amplifier to a final control element, and a phase-sensing unit whose response is determined by the phase of the control signal from the output of the bridge circuits, has according to the invention, a switching unit which is connected to the phase-sensing unit coupled through an auxiliary amplifier to the control-signal amplifier, while the final control element is a series combination of a magnetic amplifier and a power rectifier connected through the switching unit to the load.

Other objects and advantages of the invention will become more fully apparent from the following description of a preferred embodiment when read in connection with the accompanying drawing the sole FIGURE of which shows a schematic circuit diagram of a reversing proportional process controller according to the invention.

Referring to the drawing, there is provided a reversing proportional process controller which comprises a controlled-variable transmitter 1 whose resistance varies as the value of the controlled variable changes. This transmitter 1 is placed in an arm of a bridge circuit 2 whose output is connected to an amplifier 3 which is coupled through a control-voltage rectifier 4 to the control (DC) winding of a magnetic amplifier 5.

The e.m.f. induced by the supply voltage in the gate (AC) winding of the magnetic amplifier 5 is applied to a power rectifier 6. The output of the power rectifier 6 is connected through a switching unit 7 to the load 8. The magnetic amplifier 5 and the power rectifier 6 are connected in series and make up the final-control element of the controller.

The output of the amplifier 3 is also coupled through an auxiliary amplifier 9 to a phase-sensing unit 10. The auxiliary amplifier 9 is composed of a common-emitter amplifier built around a transistor 11, and an emitter follower based on a transistor 12. The phase-sensing unit 10 and the bridge circuit 2 are energized from the same AC source, i.e., a transformer 13, which provides for in-phase supply. The phase-sensing unit 10 has two outputs coupled to relays 14 and 15. The switching unit uses contactors 16 and 17. Their coils are connected to a source 18 through contacts 19 and 20 of the relays 14 and 15, respectively. The load 8 is connected to the power rectifier 6 through contacts 21/21' and 22/22' of the contactors 16 and 17, respectively.

The operation of the controller will now be considered, taking as an example a thermostat controlled cabinet using a semiconductor thermopile. Assume that for some reason the temperature in the cabinet goes above a predetermined level.

As a result, the resistance of the transmitter 1 decreases, and the balance of the bridge circuit 2 is upset. The resultant out-of-balance (or error) signal is amplified by the amplifier 3, rectified by the rectifier 4 and traverses the DC (control) winding of the magnetic amplifier 5, the current through the control winding being proportional to the magnitude of the out-of-balance of the bridge 2.

The flow of the out-of-balance current through the control winding of the magnetic amplifier 5 brings about a change in the opposition of the magnetic amplifier to the AC supply voltage, so that there is a change in the value of the voltage applied to the input of the power rectifier 6 and; consequently, in the value of its output voltage.

The switching unit 7 impresses this voltage on the thermopile, which is the load, and a current is caused to flow through the thermopile.

Depending on the direction of current flow, the thermopile either absorbs heat from, or supplies heat to, the cabinet. In the case of an assumed temperature rise, the direction of current flow should apparently be such that the thermopile will absorb heat, and the current will be proportional to the deviation of the temperature from the predetermined point.

Alternatively, in the case of a temperature drop, the direction of current flow through the thermopile should provide for heat input to the cabinet. Therefore, the controller has provisions for automatic reversal of current flow through the thermopile so as to minimize the rise or fall in the temperature of the controlled cabinet.

For this purpose, use is made of the fact that the phase of the error signal from the bridge circuit 2 is also reversed, depending on the sign of out-of-balance.

Correlation between the phase of the error signal from the bridge circuit 2 and the desired direction of current flow through the thermopile is accomplished by the phase-sensing unit 10 which compares the phase of the error signal from the bridge circuit 2 with the phase of the supply voltage. Thus, the phase-sensing unit 10 indicates whether the temperature in the cabinet is rising or falling.

The phase-sensing unit 10 is in effect a full-wave rectifier. At any instant of time there is a current flowing through the transistors 23 or 24 whose base and collector are negative with respect to its emitter. When the transistor 23 is conducting, the transistor 24 is cut off by the voltage supplied to its base. Then, depending on the polarity of the voltage impressed on the windings 25, 26, 27 and 28 of the transformer 13, either the relay 14 or the relay 15 is energized. Assume that it is the relay 15 that is energized. The relay 15 operates, and it contacts 20 convey supply voltage to the coil of the contactor 17. The contacts 22 and 22' of that contactor make.

The contacts 21 and 21' of the relay 14 remain open. The output voltage of the power rectifier 6 is fed through the contacts 22 and 22' to the thermopile (the load 8). The current through the thermopile flows in a direction such that the thermopile absorbs heat, and the temperature in the cabinet is lowered to the requisite level.

Should the temperature in the cabinet drop, the signal taken from the bridge circuit 2 and applied to the bases of the transistors 23 and 24 of the phase-sensing unit undergoes a phase reversal. Referring to the schematic illustration of the unit 10, for the same polarity of the voltage across the half-windings 25 through 28, the current will now flow through the relay 14, and will not flow through the relay 15.

The relay 14 operates, and its contacts 19 apply voltage to the coil of the contactor 16. Its contacts 21 and 21' close. The contacts 22 and 22' remain open. Referring to the schematic illustration of the switching unit 7, the current through the thermopile (the load 8) is reversed, and its direction becomes such that the thermopile generates heat, and the temperature in the cabinet is brought up to the requisite point.

In order that automatic reversal of current flow should occur at a minimum out-of-balance of the bridge circuit 2, that is, in the very beginning of the control zone, the error signal is built up by the auxiliary amplifier 9 before it is applied to the phase-sensing unit 10.

The controller disclosed herein offers an increase of efficiency of 75 percent, a decrease of weight by half or more, a material reduction in the controller size and in the number of magnetic amplifiers and transformers, and excludes a ballast resistor with the associated cooling system.

What we claim is:

1. A reversing proportional process controller based on the adjustment of the current of a load, said controller comprising in combination: a bridge circuit having arms and a controlled variable transmitter placed in one arm of said bridge circuit; a control-signal amplifier connected to said bridge circuit; an auxiliary amplifier connected to said control-signal amplifier; a phase-sensing unit having an input connected to said auxiliary amplifier; a switching unit operatively connected to and controlled by said phase-sensing unit; and a final control element constituted as a series combination of a magnetic amplifier and a power rectifier, said power rectifier being connected to the load through said switching unit, said magnetic amplifier being electrically connected to said control signal amplifier at the output thereof.

2. A controller as claimed in claim 1 comprising a control voltage rectifier connected between said magnetic amplifier and said control-signal amplifier.